(12) United States Patent
Axelrod

(10) Patent No.: US 8,182,855 B2
(45) Date of Patent: May 22, 2012

(54) FISH FOOD CONTAINING FERMENTED SOYFOOD

(75) Inventor: Glen S. Axelrod, Colts Neck, NJ (US)

(73) Assignee: T.F.H. Publications, Inc., Neptune City, NJ (US)

( * ) Notice: Subject to any disclaimer, the term of this patent is extended or adjusted under 35 U.S.C. 154(b) by 269 days.

(21) Appl. No.: 12/033,814

(22) Filed: Feb. 19, 2008

(65) Prior Publication Data

US 2008/0199568 A1  Aug. 21, 2008

Related U.S. Application Data

(63) Continuation-in-part of application No. 10/994,524, filed on Nov. 22, 2004, now Pat. No. 7,332,188.

(51) Int. Cl.
*A23K 1/18* (2006.01)
*A23K 1/10* (2006.01)

(52) U.S. Cl. .............. 426/457; 436/46; 436/49; 436/72; 436/512; 436/634; 436/656; 436/658; 436/635; 436/805

(58) Field of Classification Search .................. 426/132, 426/72, 74, 634, 656, 657, 658, 805, 635, 426/512, 457, 46, 49
See application file for complete search history.

(56) References Cited

U.S. PATENT DOCUMENTS

| | | | |
|---|---|---|---|
| 2,904,436 A * | 9/1959 | Auerbach | 426/635 |
| 3,062,657 A * | 11/1962 | Vollink | 426/446 |
| 3,361,566 A * | 1/1968 | Axelrod | 426/92 |
| 3,585,022 A * | 6/1971 | Gray | 504/187 |
| 3,917,851 A | 11/1975 | Arnaud | |
| 3,939,284 A | 2/1976 | Akin et al. | |
| 4,053,646 A | 10/1977 | Wright et al. | |
| 4,145,447 A | 3/1979 | Fisher et al. | |
| 4,150,612 A * | 4/1979 | Kessler | 100/2 |
| 4,160,038 A | 7/1979 | Groben et al. | |
| 4,212,890 A * | 7/1980 | Tiefenbacher et al. | 426/69 |
| 4,466,982 A | 8/1984 | McDonald | |
| 4,537,785 A | 8/1985 | Nichols | |
| 4,735,808 A | 4/1988 | Scaglione et al. | |
| 4,808,417 A * | 2/1989 | Masuda | 426/2 |
| 4,853,242 A | 8/1989 | Poeppinghausen | |
| 5,053,234 A * | 10/1991 | Anderson et al. | 426/59 |
| 5,128,153 A | 7/1992 | Axelrod | |
| 5,200,212 A | 4/1993 | Axelrod | |
| 5,240,720 A | 8/1993 | Axelrod | |
| 5,339,771 A | 8/1994 | Axelrod | |
| 5,419,283 A | 5/1995 | Leo | |
| 5,523,293 A * | 6/1996 | Jane et al. | 514/21 |
| 5,596,865 A | 1/1997 | Kramer | |
| 5,773,051 A | 6/1998 | Kim | |
| 5,827,565 A | 10/1998 | Axelrod | |
| 5,922,379 A * | 7/1999 | Wang | 426/138 |
| 5,941,197 A | 8/1999 | Axelrod | |
| 5,989,604 A | 11/1999 | Wolf et al. | |
| 6,056,991 A | 5/2000 | Axelrod | |
| 6,067,941 A | 5/2000 | Axelrod | |
| 6,086,940 A | 7/2000 | Axelrod | |
| 6,093,427 A | 7/2000 | Axelrod | |
| 6,093,441 A | 7/2000 | Axelrod | |
| 6,103,290 A | 8/2000 | Wenger | |
| 6,110,521 A | 8/2000 | Axelrod | |
| 6,126,978 A | 10/2000 | Axelrod | |
| 6,159,516 A | 12/2000 | Axelrod | |
| 6,165,474 A | 12/2000 | Frudakis et al. | |
| 6,180,161 B1 | 1/2001 | Axelrod | |
| 6,207,202 B1 * | 3/2001 | Crews | 426/72 |
| 6,274,182 B1 | 8/2001 | Axelrod et al. | |
| 6,299,928 B1 * | 10/2001 | Takeuchi et al. | 426/656 |
| 6,312,746 B2 | 11/2001 | Paluch | |
| 6,379,725 B1 | 4/2002 | Wang et al. | |
| 6,455,083 B1 | 9/2002 | Wang | |
| 6,566,436 B1 | 5/2003 | Guntherberg et al. | |
| 6,586,027 B2 | 7/2003 | Axelrod | |
| 6,799,413 B2 | 10/2004 | Aylward | |
| 6,821,538 B2 | 11/2004 | Axelrod | |
| 6,916,497 B2 * | 7/2005 | Axelrod et al. | 426/132 |
| 7,097,869 B2 | 8/2006 | Hayabuchi et al. | |
| 7,332,188 B2 | 2/2008 | Axelrod | |
| 2004/0013656 A1 | 1/2004 | Matsubara | |
| 2004/0043131 A1 | 3/2004 | Fumita | |
| 2004/0081723 A1 | 4/2004 | Kurzinger et al. | |
| 2004/0175456 A1 | 9/2004 | Keilbach et al. | |
| 2004/0265451 A1 * | 12/2004 | Rooks et al. | 426/489 |
| 2005/0089549 A1 * | 4/2005 | Chi et al. | 424/442 |
| 2005/0142263 A1 | 6/2005 | Keilbach | |
| 2005/0276895 A1 | 12/2005 | Fuchi et al. | |
| 2006/0110500 A1 | 5/2006 | Axelrod | |
| 2007/0289552 A1 | 12/2007 | Axelrod | |

FOREIGN PATENT DOCUMENTS

| | | | |
|---|---|---|---|
| EP | 1527700 A1 * | 5/2005 | |
| JP | 61202659 A * | 9/1986 | |
| JP | 63301757 A * | 12/1988 | |
| JP | 06178657 | 6/1994 | |
| JP | 07222554 | 8/1995 | |
| JP | 2000325044 A * | 11/2000 | |
| JP | 2004014346 | 2/2004 | |
| NL | 8401475 | 12/1985 | |

OTHER PUBLICATIONS

"Biofoods" brochure, downloaded from archived pages of website http://www.biofoodsltd.com/Soynatto, htm, Jun. 4, 2002, 10 pages.*
Chokshi et al. Iranian J. Pharmaceutical Res., vol. 3, pp. 3-16, 2004.*
Zeus Technical Whitepaper, "Melt Extrusion: The Basic Process", Zeus Industrial Products, Inc. 2006, pp. 1-10.*
European Search Report dated Mar. 3, 2009 in European Patent Application No. 05849403.0-1221.

(Continued)

*Primary Examiner* — Chhaya Sayala
(74) *Attorney, Agent, or Firm* — Grossman, Tucker, Perreault & Pfleger, PLLC

(57) ABSTRACT

The present invention relates to an enriched fish food product comprising a binder resin and a fermented soy nutraceutical. Optionally the nutraceutical may contain enzymes or coenzymes. Also, the enriched fish food product may be formed by mixing a resin with the fermented soy nutraceutical in a heated molding machine and subjecting said product to a variety of size reduction processes. For example, the fish food product may be provided in the form of a flake.

16 Claims, No Drawings

OTHER PUBLICATIONS

International Search Report and Written Opinion dated Apr. 6, 2009 issued in related International Patent Application No. PCT/US09134404.

Daidzein [online], [retrieved on Nov. 18, 2004] Retrieved from PDRhealth, using Internet <URL: http://www.pdrhealth.com/dru~info/nmdrugprofiles/nutsupdrugs/dai_0089.shtml. (4 pages).

Glycitein [online], [retrieved on Nov. 18, 2004] Retrieved from PDRhealth, using Internet <URL: http://www.pdrhealth.com/dru~info/nmdrugprofiles/nutsupdrugs/gly_0128.shtml. (2 pages).

*Saccharomyces cerevisiae* [online], [retrieved on Nov. 18, 2004] Retrieved from Wikipedia, using Internet <URL: http://en.CS Wikipedia.org/wiki/Saccharomyces_cerevisiae>. (1 page).

Genistein [online], [retrieved on Nov. 18, 2004] Retrieved from PDRhealth, using Internet <URL: http://www.pdrhealth.com/drugJnfo/nmdrugprofiles/nutsupdrugs/gen_0118.shtml>. (4 pages).

Phytochemicals [online], [retrieved on Nov. 18, 2004] Retrieved from the Linus Pauling Institute, using Internet <URL: http://lpi.oregonstate.edu/infocenter/phytochemicals.html>. (2 pages).

Bio-Foods, Ltd. The Next Generation of Coenzyme is Here BT-CoQIO Bio-Transformed. N.J. 2003.. (5 pages).

What is Fermentation Soynatto[online], [retrieved on Oct. 25, 2004] Retrieved from Bio-Foods, Ltd., using Internet<URL: http://www.biofoodsltd.comlWhatIsFermentation.htm>. (3 pages).

What is Fermentation? [online], [retrieved on Sep. 25, 2004] Retrieved from Bio-Foods, Ltd., using Internet <URL:http://www.biofoodsltd.comNutriFermentation.htm>. (2 pages).

Coenzyme QI0 [online], [retrieved on Nov. 18, 2004] Retrieved from the Linus Pauling Institute, using Internet <URi.: http://lpLoregonstate.edu/infocenter/othernutstcoqlOl>. (13 pages).

Coenzyme/Cofactor (biochemistry) [online], [retrieved on Nov. 18, 2004] Retrieved from Wikipedia, using Internet <URL: http://en.Wikipedia.org/wiki/Cofactor_%biochemistryOlo29>. (2 pages).

Antioxidant [online], [retrieved on Nov. 18, 2004] Retrieved from the Linus Pauling Institute, using Internet <URL: http://IpLoregonstate.edu/infocenterglossary.htm1>. (1 page).

Phytonutrients [online], [retrieved on Nov. 18, 2004] Retrieved from the Oral Cancer Foundation, using Internet <URL: http://www.oralcancerfoundation.org/facts/phytonutrients.htm>. (2 pages).

Functional Foods [online], [retrieved on Nov. 18, 2004] Retrieved from Web Dieticians, using Internet <URL: http://www.webdieticians.org/Public/GovemmentAffairs/92_adap1099cfm>. (15 pages).

Ubiquinone [online], [retrieved on Nov. 18, 2004] Retrieved from Merriam-Webster OnLine, using Internet <URL:http://www.m-w.com>. (I page).

Quinone [online], [retrieved on Nov. 18, 2004] Retrieved from Merriam-Webster OnLine, using Internet <URL: http://www.m-w.com>. (1 page).

Bio-Foods, Ltd. One of the Worlds Best Functional Foods Now Has Nutraceutical Health Benefits. N.J. 2003. (6 pages).

*Saccharomyces cerevisiae* [online], [retrieved on Nov. 18, 2004] Retrieved from University of Leicester Department of Microbiology and Immunology, using Internet <URL: http://www-micro.msb.le.ac.uk/video/Scerevisiae.html>. (3 pages).

Chinese Office Action dated Feb. 5, 2010 issued in related Chinese Patent Application No. 200580045293.4.

* cited by examiner

FISH FOOD CONTAINING FERMENTED SOYFOOD

CROSS REFERENCE TO RELATED APPLICATIONS

This application is a continuation-in-part of U.S. application Ser. No. 10/994,524, filed Nov. 22, 2004, now U.S. Pat. No. 7,332,188, entitled "Animal Chew Containing Fermented Soyfood", the disclosure of which is incorporated herein by reference in its entirety as if set forth fully herein.

FIELD OF INVENTION

The present invention relates to a food product for fish, particularly fish that may be maintained in an aquarium. More particularly, the present invention relates to the use of fermented soy in a fish food product, uniquely enriched by vitamins and minerals or other additives. The selected composition may be incorporated within substrates that are utilized in fish food, such as fishmeal. The fish food may also include binders such as starch binders. The starch binders may specifically include wheat, rice, potato and other types of plant starches.

BACKGROUND

A number of disclosures have been made regarding the development of food products that are digestible and nutritious. Attention is therefore directed to the following exemplary disclosures, particularly directed at dog chews: U.S. Pat. Nos. 6,586,027 "Health Chew Toy"; 6,180,161 "Heat Modifiable Edible Dog Chew; 6,159,516 "Method of Molding Edible Starch; 6,126,978 "Edible Dog Chew"; 6,110,521 "Wheat and Casein Dog Chew with Modifiable Texture"; 6,093,441 "Heat Modifiable Peanut Dog Chew"; 6,093,427 "Vegetable Based Dog Chew"; 6,086,940 "High Starch Content Dog Chew"; 6,067,941 "Animal Chew"; 6,056,991 "Turkey and Rice Dog Chew With Modifiable Texture"; 5,941,197 "Carrot Based Dog Chew"; 5,827,565 "Process for Making an Edible Dog Chew"; 5,339,771 "Animal Chew Toy Containing Animal Meal; 5,240,720 "Dog Chew with Modifiable Texture"; 5,200,212 "Dog Chew with Modifiable Texture". Attention is also directed to U.S. Pat. No. 6,165,474 entitled "Application for Patent for Nutriceutical Toy" and U.S. Pat. No. 5,419,283 entitled "Animal Chew Toy of Starch Material and Degradable Ethylene Copolymer".

In the field of food for fish, particularly fish that may be kept in an aquarium, a body of art has been disclosed suggesting the use of flakes, granules and pellets as carriers for vitamins, proteins, etc. For example, U.S. application Ser. No. 10/803,803 reports on a method of preparing fish food flakes including the use of vitamins and certain other nutritional ingredients.

There is nonetheless a need to improve on the above, particularly with respect to the delivery of vitamins and minerals and nutrients. Particularly, the field has recognized the sensitivity of vitamins to heat, light, oxidizing agents, extremes in pH and other factors. Therefore to advance health care for animals, such as fish, there is a need to consider the loss of such vitamins while processing the food products and/or to identify newer type supplements that enhance the nutritional nature of the food itself.

Accordingly, it is an object of the present invention to provide a fish food product that is enriched with vitamins and minerals to ensure that the fish's comprehensive and proper nutritional needs are maintained. In addition, it is also an object of the present invention to incorporate vitamins and minerals in a form that preserves the efficacy of the vitamins. More particularly, it is an object of the present invention to incorporate a nutraceutical of fermented soya and/or enzymes and coenzymes to the fish food product.

SUMMARY

An aspect of the present invention relates to an enriched fish food product comprising a resin and a fermented soya nutraceutical. The composition of this product may be supplemented to include further nutrients, flavoring, attractants and constituents which may be especially suitable for the feeding of aquarium fish.

Another aspect of the present invention relates to a method of forming an enriched fish food product by combining a resin and a fermented soya nutraceutical to form a mixture. The mixture may then be introduced and heated in an extruder containing a feed section, barrel and output section, including a plurality of heating zones extending from the hopper section to the output section. The output of the extruder may then be cooled to form the mixture into a fish food product in pellet, granule, flake or tablet form.

Another aspect of the present invention relates to an enriched fish food product comprising a resin and a fermented enzyme and/or a coenzyme.

Another aspect of the present invention relates to a method of forming an enriched fish food product by combining a resin and a fermented enzyme and/or coenzyme to form a mixture and introducing and heating said mixture in an extruder containing a feed section, a barrel section and an output section, including a plurality of heating zones extending from said hopper section to said output section. The output of the extruder may then be cooled and formed into a fish food product in pellet, granule, flake or tablet form.

DETAILED DESCRIPTION

The present invention relates to the development of a resin based fish food product in pellet, granule, flake or tablet form that is enriched with vitamins and minerals to contribute to the overall nutritional needs/requirements of such fish. More particularly, the present invention is directed at incorporating fermented soya nutraceutical into a fish food product that may include a binder resin. A nutraceutical is reference to any food, as the case may be, that is delivered to an animal.

Beginning with the binder resin component, such resin may be selected from the group consisting of starch, casein, denatured and partially hydrolyzed collagen, wheat gluten, proteins, and mixtures thereof. Starches utilized in the present invention may include potato starch, tapioca starch, corn starch, wheat starch and mixtures thereof. Fishmeal may also be employed as a binder resin, which may be understood as ground and processed fish that has been dried to a moisture level of between about 1-15% by weight. Preferably, the binder resin component may be present at levels of about 60-99% (wt.), and all incremental values therebetween.

By way of representative example, in the case of starch, e.g., the process herein may rely upon combining starch with water to form a mixture such that the mixture is suitable for melt processing techniques. In that regard, attention is directed at commonly owned U.S. Pat. No. 6,159,516, whose teachings are incorporated by reference which discloses a preferred process for forming starch into a molded article. The process makes use of melt processing techniques and comprises combining starch and water wherein the water content is in the range of 20.0% to 40.0% by weight with respect to that of said starch, introducing and heating said mixture in an extruder wherein the water content of said product upon discharge from said extruder is less than the water content of said product entering said extruder, and introducing the product to a heated injection molding machine and injection molding and cooling to form said molded article wherein the water content is at or below 20% by weight. This product may then be converted to a desired form and shape of fish food by such processes as granulating or, cryogenic grinding. In another embodiment, the product exiting the extruder may be pelletized or may be converted to flake form by vacuum, heat or freeze drying.

Accordingly in connection with the above referenced processes and applicable to other processes herein described, the vitamins and minerals may be added with a binder resin, e.g., starch, prior to mixing or formation. It is therefore worth noting that in the context of the present invention, it has been uniquely appreciated that the vitamin and mineral additives may be injection molded or extruded in the starch mixtures without substantial thermal degradation of such additives which degradation may attenuate or eliminate their therapeutic effect. In the context of the present invention, it is therefore preferable that a nutraceutical of fermented soya and/or enzymes and coenzymes may be added to the starch mixtures.

In one exemplary embodiment, the nutraceutical of fermented soya may be a soya from Bio Foods, Ltd., Pine Brook, N.J. and sold under the general trademark SOYNATTO, and more specifically SOYNATTO® F614 and F625. Preferably, the fermented soya may be present between 1-40% (wt.), and resin (e.g., starch as noted above) may be present at levels of about 99-60% (wt.), including all incremental values therebetween with respect to such ranges. The SOYNATTO® product is more specifically described to contain the following as compared to other available compositions:

| | | Made With | | | | Constituents | | |
|---|---|---|---|---|---|---|---|---|
| Nutrient | Units per 100 g | IEFS | Soynatto ® | Tempeh | Miso Paste | soy protein isolate | Soy milk as fluid | Tofu, regular |
| Proximates | | | | | | | | |
| Protein | g | 37.00 | 37.00 | 18.54 | 11.81 | 80.69 | 2.75 | 8.08 |
| Total lipid | g | 7.50 | 7.50 | 10.80 | 6.07 | 3.39 | 1.91 | 4.78 |
| Carbohydrate | g | 40.00 | 40.00 | 9.39 | 27.96 | 7.36 | 1.81 | 1.88 |
| Fiber, total dietary | g | 12.02 | 12.02 | | 5.40 | 5.60 | 1.30 | 0.30 |
| Minerals | | | | | | | | |
| Calcium | mg | 151.50 | 151.50 | 111.00 | 66.00 | 178.00 | 4.00 | 350.00 |
| Iron | mg | 5.21 | 5.21 | 2.70 | 2.74 | 14.50 | 0.58 | 5.36 |
| Magnesium | mg | 191.25 | 191.25 | 81.00 | 42.00 | 39.00 | 19.00 | 30.00 |
| Phosphorus | mg | 608.25 | 608.25 | 266.00 | 153.00 | 776.00 | 49.00 | 97.00 |
| Potassium | mg | 1957.50 | 1957.50 | 412.00 | 164.00 | 81.00 | 141.00 | 121.00 |
| Sodium | mg | 18.30 | 18.30 | 9.00 | 3647.00 | 1005.00 | 12.00 | 7.00 |
| Zinc | mg | 3.84 | 3.84 | 1.14 | 3.32 | 4.03 | 0.23 | 0.80 |
| Copper | mg | 3.93 | 3.93 | 0.56 | 0.44 | 1.60 | 0.12 | 0.19 |
| Manganese | mg | 2.40 | 2.40 | 1.30 | 0.86 | 1.49 | 0.17 | 0.61 |
| Selenium | mcg | 27.98 | 27.98 | 0.02 | 1.60 | 0.80 | 1.30 | 8.90 |
| Lithium | mcg | 60.00 | 60.00 | tr | tr | tr | tr | tr |
| Molybdenum | mcg | 6.00 | 6.00 | tr | tr | tr | tr | tr |
| Nickel | mcg | 30.00 | 30.00 | tr | tr | tr | tr | tr |
| Tin | mcg | 12.00 | 12.00 | tr | tr | tr | tr | tr |
| Lipids | | | | | | | | |
| Fatty acids, saturated | g | 1.22 | 1.22 | 2.22 | 0.88 | 0.42 | 0.21 | 0.69 |
| Fatty acids, monounsaturated | g | 1.70 | 1.70 | 3.00 | 1.34 | 0.65 | 0.33 | 1.06 |
| Fatty acids, polyunsaturated | g | 4.14 | 4.14 | 3.83 | 3.43 | 1.65 | 0.83 | 2.70 |
| Omega-6 Fatty Acid | g | 3.57 | 3.57 | 3.59 | 3.02 | 1.45 | 0.74 | 2.38 |
| Omega-3 Fatty Acid | g | 0.55 | 0.55 | 0.22 | 0.41 | 0.20 | 0.10 | 0.32 |
| Vitamins | | | | | | | | |
| Thiamin | mg | 1.79 | 1.79 | 0.08 | 0.10 | 0.18 | 0.16 | 0.08 |
| Riboflavin | mg | 1.04 | 1.04 | 0.36 | 0.25 | 0.10 | 0.07 | 0.05 |
| Niacin | mg | 7.62 | 7.62 | 2.64 | 0.86 | 1.44 | 0.15 | 0.20 |
| Pantothenic acid | mg | 2.34 | 2.34 | 0.28 | 0.26 | 0.06 | 0.05 | 0.07 |
| Vitamin B-6 | mg | 0.99 | 0.99 | 0.22 | 0.22 | 0.10 | 0.04 | 0.05 |
| Folic | mcg | 532.50 | 532.50 | 23.90 | 33.00 | 176.10 | 1.50 | 15.00 |
| Vitamin A | IU | 30.00 | 30.00 | 0.00 | 87.00 | 0.00 | 32.00 | 85.00 |
| Vitamin E | mg_ATE | 0.15 | 0.15 | tr | 0.01 | 0.00 | 0.01 | tr |
| Biotin | mg | 0.02 | 0.02 | tr | tr | tr | tr | tr |
| Choline | mg | 60.00 | 60.00 | tr | tr | tr | tr | tr |
| Inositol | mg | 72.00 | 72.00 | tr | tr | tr | tr | tr |
| PABA | mg | 6.00 | 6.00 | tr | tr | tr | tr | tr |
| Special Nutrients | | | | | | | | |
| Isoflavones | mg | 4000.00 | 200.00 | 43.52 | 42.55 | 97.43 | 9.65 | 23.61 |
| Glycogen | g | 1.10 | 1.10 | tr | tr | tr | tr | tr |
| Beta Glucans | g | 0.50 | 0.50 | tr | tr | tr | tr | tr |
| Glutathione | mg | 60.00 | 60.00 | tr | tr | tr | tr | tr |
| SOD | unit | 1650.00 | 1650.00 | tr | tr | tr | tr | tr |
| RNA/DNA | g | 1.05 | 1.05 | | | | | |

An Empty Cell indicates a value is un-known; "tr" indicates a value is probably a trace or none.

As can be seen from the above, the SOYNATTO® product, may provide proteins, minerals, and vitamins, in a fermented soy form. The fermentation process may infuse the product with saccharomyces cerevisiae. Saccharomyces cerevisiae is commonly known as "bakers yeast" or "brewers yeast" and is more traditionally known to ferment sugars present in flour or dough, yielding carbon dioxide and alcohol. Accordingly, in the broad context of the present invention, the fish food product may contain one or more of a protein, one or more of a mineral, and one or more of a vitamin, along with saccharomyces cerevisiae.

Furthermore, it should be noted that the SOYANTTO® product herein may include increased concentrations of glycitein, daidzein and genistein, which is reportedly several hundred percent more than other more common soyfood sources. These all belong to the isofavone class of flavanoids. They may also be classified as a phytoestrogen, since they are plant derived nonsterioidal compounds that contain estrogen-like biological activity.

Optionally, the fish food product herein may include enzymes and/or co-enzymes which are similarly available through Bio Foods, Ltd., Pine Brook, N.J. and sold under the trademark BT-CoQ10, for example. This reportedly is a biologically transformed (fermented) cell mitochondrial coenzyme and may contain Coenzyme Q10, antioxidants, phytonutrients and cofactor mineral nutrients and other cell constituents. Preferably, enzymes and/or co-enzymes are present between 0.1-10% (wt.), and resin (e.g., starch as noted above) is present at levels of about 99-90% (wt.), including all incremental values therebetween with respect to such ranges. More preferably, the enzymes may be provided in combination with the fermented soya and the resin, the fermented soya present between 1-40% (wt.), the enzyme and/or coenzymes present between 0.1-10% (wt.) and the resin (e.g., starch as noted above) present at levels of about 98-50% (wt.), including all incremental values therebetween with respect to such ranges.

Reportedly, the fermented coenzyme contains coenzyme Q10 which belongs to the family of compounds known as ubiquinones, which are either of two isomeric cyclic crystalline compounds $C_6H_4O_2$ that are di-keto derivatives of dihydro-benzene. Reportedly, Coenzyme Q10 is a fat-soluble compound primarily synthesized by the body and also consumed in the diet and is required for mitochondrial ATP synthesis. It also may function as an antioxidant in cell membranes and lipoproteins. Reportedly oral supplementation of coenzyme Q10 increases plasma, lipoprotein, and blood vessel levels. Also, reportedly Coenzyme Q10 supplementation has resulted in clinical and metabolic improvement in some patients with hereditary mitochondrial disorders.

Antioxidants are reportedly substances that prevent or reduce damage caused by reactive oxygen species or reactive nitrogen species. Phytonutrients or phytochemicals are reportedly chemicals that are produced by plants and are not necessarily essential nutrients but are considered beneficial to health. Common classes of phytonutrients include carotenoids, flavoniods, phenols including polyphenols and terpenes. Cofactors are reportedly substances that need to be present in addition to an enzyme to catalyze some reactions.

Accordingly, the fish food product of the present invention may contain one or more of the above ingredients for a fish food product, in a variety of physical forms, including pellets, granules, flakes, tablets, and/or pills, along with a binder resin.

In one particularly preferred process of manufacturing the fish food product herein, starch, fermented soya nutraceutical, alone or in combination with fermented enzyme, and water are first combined wherein the water content is in the range of 20-40% by weight with respect to that of said starch. The mixture is introduced into a vented barrel extruder to form extruded strands, wherein the water content upon discharge is less than the water content of said mixture entering the extruder. The extruded strands may then be routed to a pelletizer to form pellets of fish food.

In a related exemplary embodiment, the pellets may be fed to a heated injection molding machine containing a mold and injection molding and cooling to form the molded shape, for instance a tablet or pill wherein the water content of the molded shape is at or below about 20% by weight, wherein the injection molding machine contains a feed section, a barrel and an output nozzle, including a plurality of heating zones in said barrel extending from said hopper section to said nozzle including a plurality of heating zones extending from the hopper section to said output section wherein the heating zones are set at the following temperature ranges: zone 1 is at or below about 70° F.; zone 2 is at or below about 150° F., zone 3 is at or below about 300° F. and zone 4 is at or below about 375° F. and melt mixing and molding and cooling to form said fish food shape wherein the water content of said shape is between 5% and 20% with respect to the resin so that a portion of said fermented soya nutraceutical mixed therein, or the enzymes and/or co-enzymes, are not thermally degraded by said molding. The molded shape may then be used as a fish food product or may be reduced in size to form granules by granulating or cryogenic grinding.

In another related exemplary embodiment, the output of the extruder may be discharged to one or more heated surfaces, preferably between co-acting drums which may be heated with steam, and dried to form a thin sheet. The cooled sheet may then be broken into small increments, such as flakes by any of a variety of size reduction processes, such as granulating or exposure to a rotating screw. Reference is therefore made to U.S. Pat. No. 6,207,202 and U.S. Application Publication No. 2005/0142263, whose teachings are incorporated herein by reference.

In a still further related exemplary embodiment, the output of the extruder may be formed into a thin sheet by vacuum drying or freeze drying techniques.

As those skilled in the art will appreciate, an extruder apparatus, which is one preferred mixing apparatus, or an injection molding apparatus, typically contains a feed section, a barrel, and an output nozzle, including a plurality of heating zones in the barrel extending from the hopper section to the nozzle. In accordance with the present invention, it has been found preferable to maintain the temperature in the first zone adjacent to the at less than about 150° F. More preferably, the first zone is set in the range of about 45-150° F. In an even more preferred embodiment, i.e. that situation wherein there is a first zone adjacent to the feed section, and a second zone adjacent to that first zone, the temperature of the first zone is set to between about 45-70° F., and the temperature of the second zone is set to between about 70-150° F. These temperatures are most conveniently achieved by use of cooling coils placed about the barrel of the apparatus. These cooling coils are preferably made from copper tubing, and are cooled with circulating water.

In a particularly preferred embodiment, the following temperature profile is used to mold the composition of the present invention: Zone 4 (closest to hopper)=45-70° F.; Zone 3= 70-150° F.; Zone 2=150-300° F.; Zone 1=275-375° F.; Nozzle=275-390° F. In addition, the bushing inside the mold is preferably set to about 325-425° F. The mold temperature is preferably set at 35-65° F.

As opposed to a more conventional practice of heating the barrel of the screw to melt the material in the zones proximate to the feed section, the temperature profile set forth above results in those zones thereby preventing overheating and burning of the starch mixture.

As those skilled in the art will appreciate, the product may be molded into any of a variety of shapes including pills and tablets by discharging the output of an extruder to a pill press or tablet press. In addition, although injection molding is described herein, any other type of molding process is contemplated. For example, the resin composition of the present invention may be suitable for compression molding as well as other thermoplastic processing techniques available in the art. In that regard, the herein resin/fermented soya or resin/fermented enzyme mixture may be prepared by extrusion techniques.

Another embodiment of the present invention relates to a fish food product comprising denatured and partially hydrolyzed collagen. Those skilled in the art will therefore recognize that collagen comprises the basic structural unit tropocollagen, which has a mass of about 285 kdal and consists of three polypeptide chains of about the same size. Such chain is comprised of the amino acids glycine, proline, hydroxyproline and hydroxylysine. The chain composition can depend upon the type of collagen, i.e., whether or not it is derived from, e.g., skin or cartilage. Any type of collagen source is suitable herein.

Denatured collagen is reference to the fact that the collagen when subjected to extremes of temperature or acid or alkaline conditions, denatures and separates into three polypeptide chains. The polypeptide is then partially hydrolyzed to a desired molecular weight, and dried or compounded for the application herein.

In accordance with the present invention, it has been found that it is preferable to mix the denatured and partially hydrolyzed collagen with another resin, such as casein, starch, vegetable matter, animal meal, peanut bits/flour. In such regard, the mixtures have been found to lend to melt processing under pressure, which include extrusion, injection molding and/or compression molding techniques. Accordingly, one may prepare injection molded fish food products herein, comprising denatured and partially hydrolyzed collagen, as well as fish food products that combine such collagen with the various components noted above.

In another exemplary embodiment of the present invention, one may incorporate other types of components to the fish food to increase the attraction and/or improve the cosmetic appearance of the product. For example, one may optionally incorporate flavorings at a level of 0.1-5% by weight. Preferably, flavoring may comprise both powders, liquids and mixtures thereof. Food coloring may also be incorporated at a level of 0.01 to 10% by weight. More preferably, natural flavorings and food coloring may be incorporated into the mixtures. In addition, one may optionally incorporate calcium carbonate which has been found to increase the hardness of the products produced therefrom. In addition, one may optionally incorporate a humectant such as oat fiber, in the range of 0.1-5%.

It is also worth pointing out that fish food herein which may include any one of the above referenced additives, and therefore benefit from the additive nutritional value, may first include fish food for carnivorous fish, which may therefore involve insects, worms, shell-fish and other fish sources. For example, naturally occurring water animals such as Daphnia pulex, Artemia salinas (brine shrimp), mosquito larvae, Tubifex worms, and Cyclops have been used as fish foods. In addition the fish food may include fish food for herbivorous fish, which eat vegetables, e.g., plant and/or algae. In addition, the fish food herein may be fish food for omnivorous fish, which would therefore involve a mixture of both vegetable and animal food.

The foregoing description is provided to illustrate and explain the present invention. However, the description hereinabove should not be considered to limit the scope of the invention set forth in the claims appended here to.

I claim:

1. A method of forming a fish food product comprising:
   (a) combining a binder resin and a fermented soya nutraceutical to form a mixture, wherein said binder resin comprises fishmeal having a moisture level of between 1-15% by weight and wherein said binder resin is present at 60-99% by weight of said product and wherein said mixture is suitable for melt processing;
   (b) melt processing said mixture by introducing said mixture to a heated molding machine, said heated molding machine comprising an extruder containing a feed section, a barrel section and an output section, including a plurality of heating zones extending from said hopper section to said output section, wherein said heating zones are set at the following temperature ranges: zone 1 is at or below about 70° F.; zone 2 is at or below about 150° F., zone 3 is at or below about 300° F. and zone 4 is at or below about 375° F.;
   (c) discharging said melt processed mixture from said extruder to one or more heated surfaces;
   (d) forming said melt processed mixture into a thin sheet;
   (e) drying said thin sheet; and
   (f) breaking said dried sheet into flakes.

2. The method of claim 1 wherein said forming said mixture into a thin sheet is accomplished on the surface of one or more heated drums.

3. The method of claim 1 wherein said drying of said thin sheet is by one or a combination of heat drying, vacuum drying and freeze drying.

4. The method of claim 1 wherein said breaking said dried sheet into flakes is accomplished with a rotating screw.

5. The method of claim 1 wherein said thin sheet is broken into flakes by granulating or cryogenic grinding.

6. The method of claim 1 wherein said resin is present at levels between about 60-99% by weight and said fermented soya nutraceutical is present at levels between about 1-40% by weight.

7. The method of claim 1 wherein said fermented soya nutraceutical further comprises at least one fermented enzyme, fermented coenzyme, and combinations thereof, wherein said at least one fermented enzyme, fermented coenzyme, and combinations thereof is present in an amount between about 0.1-10% by weight.

8. The method of claim 1 wherein said resin further comprises water, wherein the water content of said fish food product is between 5% and 20% by weight with respect to the resin.

9. A method of forming a fish food product comprising:
   (a) combining a binder resin and at least one fermented enzyme, fermented coenzyme, and combinations thereof to form a mixture, wherein said binder resin comprises fishmeal having a moisture level of between 1-15% by weight and wherein said binder resin is present at 60-99% by weight of said product and wherein said mixture is suitable for melt processing;
   (b) melt processing said mixture by introducing said mixture to a heated molding machine, said heated molding machine comprising an extruder containing a feed section, a barrel section and an output section, including a plurality of heating zones extending from said hopper section to said output section, wherein said heating zones are set at the following temperature ranges: zone 1 is at or below about 70° F.; zone 2 is at or below about 150° F., zone 3 is at or below about 300° F. and zone 4 is at or below about 375° F.;
(c) discharging said melt processed mixture from said extruder to one or more heated surfaces;
(d) forming said melt processed mixture into a thin sheet;
(e) drying said thin sheet; and
(f) breaking said dried sheet into flakes.

10. The method of claim 9 wherein said forming said mixture into a thin sheet is accomplished on the surface of one or more heated drums.

11. The method of claim 9 wherein said drying of said thin sheet is by one or a combination of heat drying, vacuum drying and freeze drying.

12. The method of claim 9 wherein said breaking said dried sheet into flakes is accomplished with a rotating screw.

13. The method of claim 9 wherein said thin sheet is broken into flakes by granulating or cryogenic grinding.

14. The method of claim 9 wherein said resin is present at levels between about 60-99% by weight and said at least one fermented enzyme, fermented coenzyme, and combinations thereof is present at levels between about 1-40% by weight.

15. The method of claim 9 further comprising fermented soya nutraceutical, said fermented soya nutraceutical is present at levels between about 1-40% by weight.

16. The method of claim 9 wherein said resin further comprises water, wherein the water content of said fish food product is between 5% and 20% by weight with respect to the resin.

* * * * *